(12) United States Patent
Vican

(10) Patent No.: US 7,201,420 B2
(45) Date of Patent: Apr. 10, 2007

(54) VEHICLE DISPLAY SCREEN

(75) Inventor: Rudy M. Vican, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 59 days.

(21) Appl. No.: 10/995,844

(22) Filed: Nov. 23, 2004

(65) Prior Publication Data
US 2006/0108820 A1   May 25, 2006

(51) Int. Cl.
*B60N 3/12* (2006.01)
(52) U.S. Cl. .................. 296/37.12; 296/37.8; 348/837
(58) Field of Classification Search .............. 296/37.1, 296/37.8, 37.12, 70; 455/347, 348; 348/837; 345/7; 185/37; 74/89.2, 89.22; 340/815.4, 340/815.83, 416, 815.49, 461, 89.22; 248/27.1
See application file for complete search history.

(56) References Cited

U.S. PATENT DOCUMENTS

| 5,467,106 | A | 11/1995 | Salomon | 345/87 |
|---|---|---|---|---|
| 5,823,599 | A | 10/1998 | Gray | 296/37.8 |
| 5,946,055 | A | 8/1999 | Rosen | 348/837 |
| 6,049,288 | A * | 4/2000 | Kawasaki | 340/815.4 |
| 6,125,030 | A * | 9/2000 | Mola et al. | 296/37.8 |
| 6,152,514 | A | 11/2000 | McLellen | 296/37.8 |
| 6,181,387 | B1 | 1/2001 | Rosen | 348/837 |
| 6,246,449 | B1 | 6/2001 | Rosen | 348/837 |
| 6,354,649 | B1 * | 3/2002 | Lee | 296/70 |
| 6,663,155 | B1 | 12/2003 | Malone et al. | 296/37.8 |

* cited by examiner

*Primary Examiner*—Lori L. Coletta
(74) *Attorney, Agent, or Firm*—Laura C. Hargitt

(57) ABSTRACT

A display unit for a motor vehicle comprises a screen and a guide member defining an arced track. The screen is movable with respect to the arced track between a retracted position, wherein the screen rests at a first angle with respect to vertical, and an extended position, wherein the screen extends upward and rests at a second angle with respect to vertical.

19 Claims, 3 Drawing Sheets

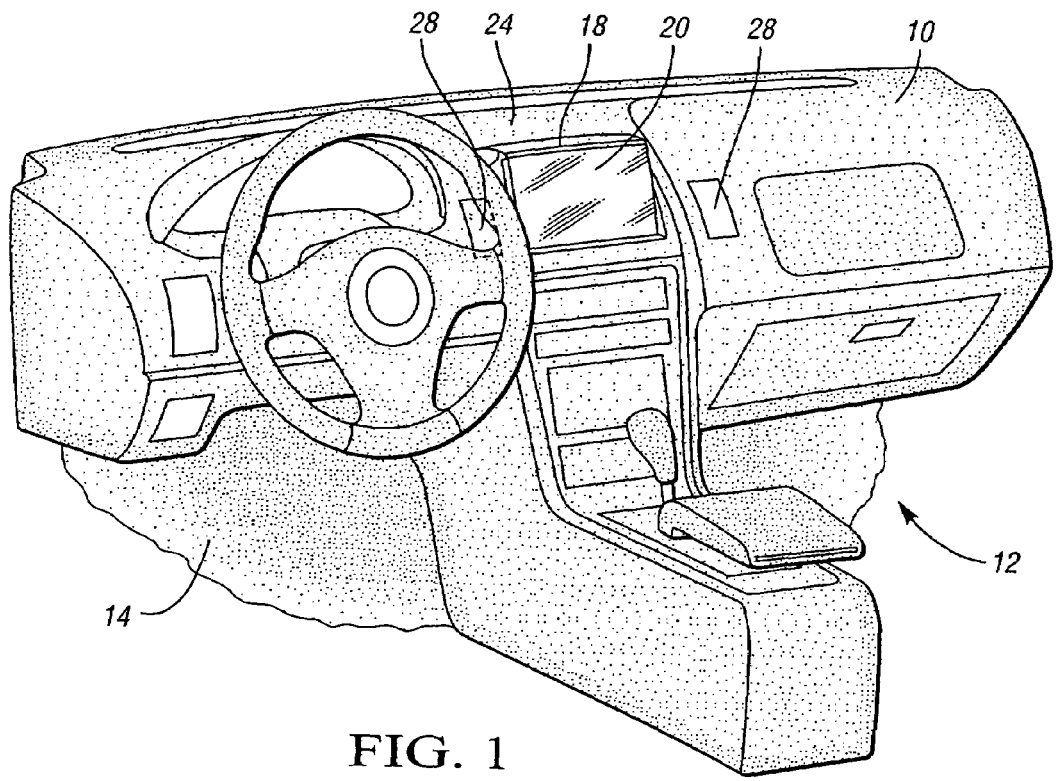
FIG. 1
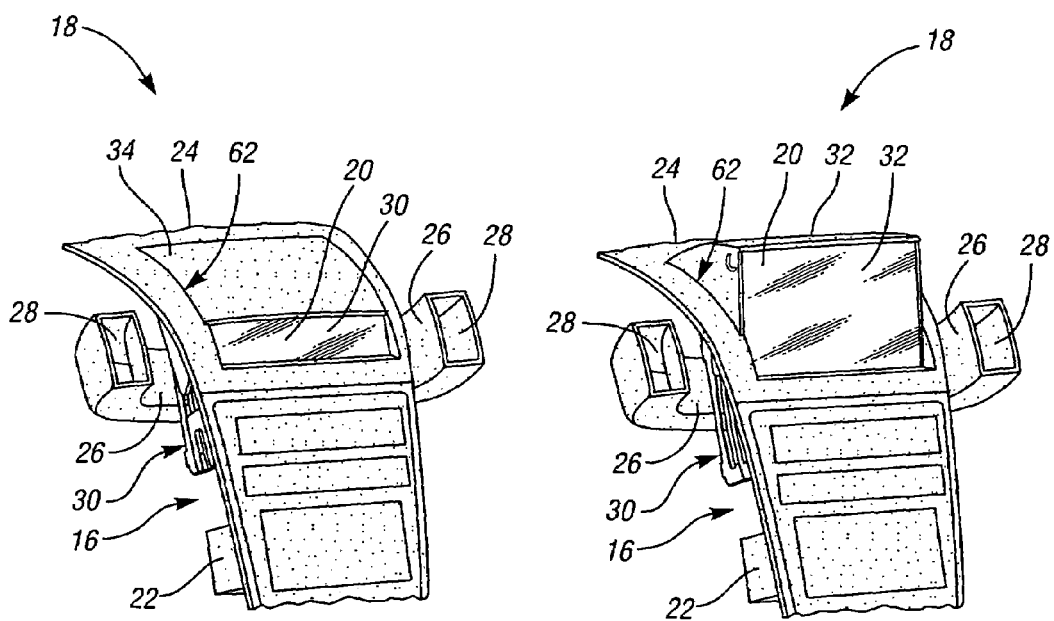
FIG. 2a
FIG. 2b

VEHICLE DISPLAY SCREEN

TECHNICAL FIELD

The present invention relates to a display unit configured to be viewable by occupants of a vehicle.

BACKGROUND OF THE INVENTION

Automotive manufacturers are increasingly including display screens viewable by vehicle occupants within a passenger compartment. The display screens can be configured to display vehicle information, such as vehicle or outside temperature, directional information, tire pressure, or any other data stored within a vehicle controller. Additionally, the screens may be connected to other devices such as digital video disc (DVD) units or video gaming units, thereby allowing vehicle occupants a number of entertainment options. Furthermore, the screens may be configured to display intricate navigational information, such as maps or printed directions, thereby allowing a driver to access critical information within the passenger compartment. The screens typically extend substantially vertically. For screens retractable into a vehicle console, packaging of other vehicle components may be affected.

SUMMARY OF THE INVENTION

A display unit for a motor vehicle comprises a screen and a guide member defining an arced track. The screen is movable with respect to the arced track between a retracted position, wherein the screen rests at a first angle with respect to vertical, and an extended position, wherein the screen extends upward and rests at a second angle with respect to vertical; preferably approximately vertically. The guide member may include a bracket slidable along the arced track, with the screen attached to the bracket to move between the retracted and extended positions. Preferably, when the screen rests in the retracted position, it is substantially parallel with adjacent vehicle interior structure (e.g., a vehicle console or an instrument panel).

In one aspect of the invention, the bracket defines an adjustment slot. The screen includes a pin which travels along the adjustment slot to move the screen from the second angle to a third angle at said extended position.

In one aspect of the invention, a motor may be operatively connected to the guide member and actuatable to move the screen with respect to the arced track between the retracted and extended positions.

Alternatively, springs may be operatively connected to the guide member and releasable upon operator actuation to move the screen with respect to the arced track.

In yet another aspect of the invention, a door covers a top face of the screen in both the retracted and extended positions. Preferably, at least one side wall extends substantially perpendicularly away from the door and defines a slot. The screen may include a pin which travels along the slot as the screen moves between the retracted and extended positions, thereby allowing the door to cover the top face of the screen throughout movement between the retracted and extended positions.

In yet another aspect of the invention, a motor vehicle includes vehicle interior structure, which may be a console or an instrument panel, at least partially defining a cavity and an opening. The vehicle also includes a screen containable within the cavity such that the screen substantially parallels at least a portion of the vehicle interior structure and is at least partially visible through the opening. A door is pivotally attached to the vehicle interior structure at the opening.

In another aspect of the invention, the vehicle further includes a storage bin disposed within the cavity. The storage bin is accessible through the opening by pivoting the door.

Alternatively, the vehicle may include a guide member defining an arced track. The screen may be movable with respect to the track between a retracted position, wherein the screen is contained within the cavity, and an extended position wherein at least a portion of the screen extends through the opening outside of the cavity.

In yet another aspect of the invention, the guide member is nested between heating, ventilation and air conditioning (HVAC) ducts positioned to vent at the vehicle interior structure.

Preferably, an identical vehicle interior structure may be utilized with an embodiment having a movable (retractable and extendable) screen as well as with an embodiment having a fixed screen and a storage container. This may allow a manufacturer to maintain an inventory of vehicle interior structures, and change only the type of screen connected thereto depending on customer preference. If a customer desires the embodiment having the fixed screen, a storage container may be installed instead of the guide member. Accordingly, a method of installing a display screen on vehicles is also provided.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of a vehicle instrument panel incorporating a display screen according to the present invention, with the display screen in an extended position;

FIG. 2a is a schematic perspective fragmentary view of a first embodiment of the instrument panel of FIG. 1 with the display screen in a retracted position;

FIG. 2b is a schematic perspective fragmentary view of the first embodiment of the instrument panel of FIG. 1 with the display screen in the extended position;

DESCRIPTION OF THE PREFERRED EMBODIMENT

Figure 3A:
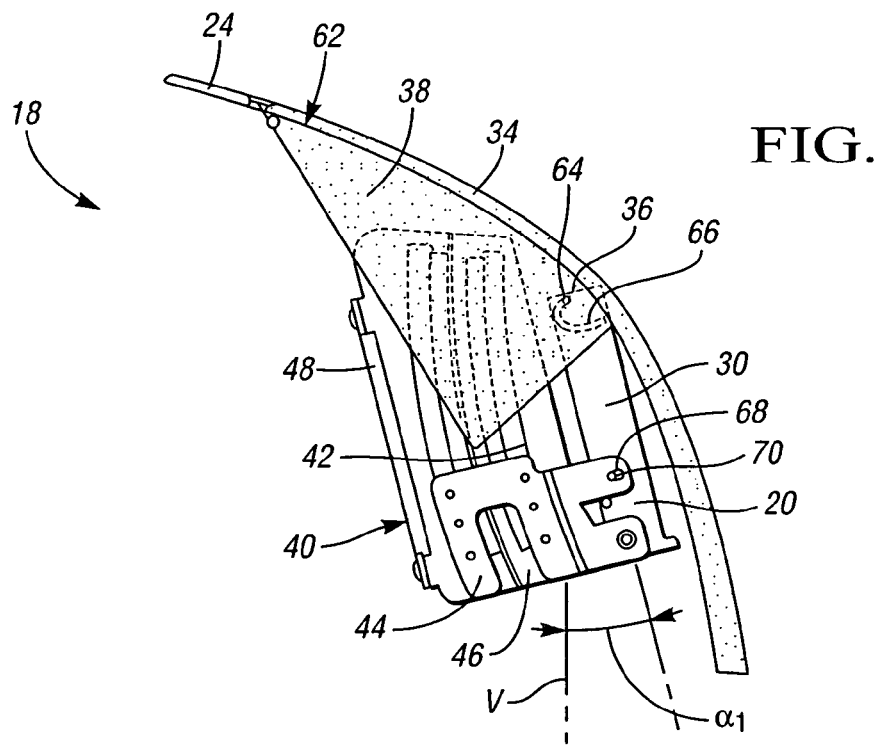
FIG. 3a is a schematic fragmentary side view of the vehicle instrument panel of FIG. 1 with a display screen in the retracted position.

Referring to FIG. 1, an instrument panel 10 for use within a vehicle passenger compartment 12 of a vehicle shown generally at 14 is depicted. FIG. 1 depicts a first embodiment of a display unit 18 including a screen 20 for displaying information retrieved from a vehicle controller 22 (shown schematically in FIGS. 2a and 2b). The display screen 20 is seated within a center console 24 between heating, venting and air conditioning (HVAC) ducts 26 (shown schematically in FIGS. 2a and 2b) venting through vents 28 in the instrument panel 10. The center console 24 partially defines a cavity 16 (indicated in FIGS. 2a and 2b) located forward of the instrument panel 10 (i.e., toward the front of the vehicle). While the screen 20 is shown seated within the console 24, within the scope of the invention, the screen 20 may be seated within any vehicle interior structure without changing the inventive concept. For instance, the screen 20 may be located on the instrument panel 10.

The information displayed by the screen 20 may be data sensed by the controller 22, such as outside air temperature or compass direction, or other information stored within the controller 22, such as navigational data. Additionally, the screen 20 may be configured to display networking or video signals.

Referring to FIGS. 2a and 2b, the screen 20 moves between a retracted position 30, shown in FIG. 2a, and an extended position 32, shown in FIG. 2b. In the retracted position 30, a portion of the screen 20 remains visible to occupants within the vehicle passenger compartment for displaying basic vehicle information such as, perhaps, temperature and time. However, at least a portion of the screen 20 is hidden within the console 24, that is, is retracted within the cavity 16 formed by the console 24 and is not visible to passengers seated within the passenger compartment. In the extended position 32, the screen 20 extends upward from within the console 24, thereby revealing a greater portion of the screen 20. Thus, in the extended position 32, more information may be viewed on the screen 20 by vehicle occupants, such as maps or other navigational data, or even a DVD or other video signal without impediment.

Figure 3B:
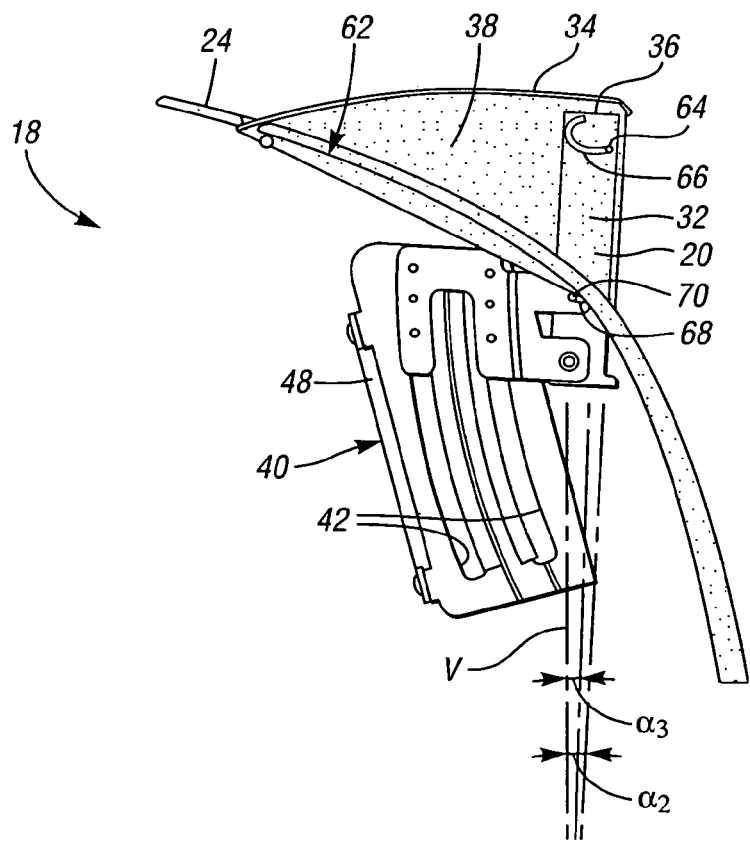
FIG. 3b is a schematic fragmentary side view of the vehicle instrument panel of FIG. 1 with the display screen in the extended position.

As best viewed in FIG. 3b, a door 34 covers a top face 36 of the screen 20, while a pair of side walls 38, one of which is shown in FIG. 2b, preferably extend downward from the door 34 and into the console 24. The sidewalls 38 lend structural support to protect the screen 20 from wear due to vehicle vibrations when in the extended position 32.

FIGS. 3a and 3b present a side view of the screen 20, and show a guide member 40 used to guide the screen 20 such that it moves between the retracted and extended positions 30, 32. The guide member 40 is shown in more detail in FIG. 4, and preferably attaches to an instrument panel retainer (not shown) forward of the instrument panel 10 in the vehicle 14. For added security, the guide member 40 may also attach to a portion of the console 24. The guide member 40 defines a pair of arced tracks 42 for receiving a pair of brackets 44 attached to the screen 20 (only one arced track 42 and bracket 44 being visible in FIG. 3a, the other being located on the opposite side of the screen in a mirror-like configuration). The brackets 44 move along the arced tracks 42 to move the screen 20 between the retracted and extended positions 30, 32. When the screen 20 is in the retracted position 30, shown in FIG. 3a, the screen 20 sits at an angle $\alpha_1$ with respect to vertical V. The angle $\alpha_1$ is roughly equivalent to a console angle defined as the angle with respect to vertical of the portion of the console 24 adjacent the screen 20. Since the screen 20 in the retracted position 30 rests at approximately the same angle as the console 24, it is positionable closer to the console 24 than it would be if the screen 20 were positioned vertically in the retracted position 30. The arced tracks 42 enable the compact packaging arrangement in the retracted position 30. Thus, the present invention provides more space for placement of vehicle components within the cavity 16 formed by the console 24 than would a screen 20 that rested vertically when retracted. The arced tracks 42 are arced such that in the extended position 32, shown in FIG. 3b, the screen 20 is positioned slightly beyond the vertical V position, at a second angle $\alpha_2$, to maximize viewability.

Figure 4A:
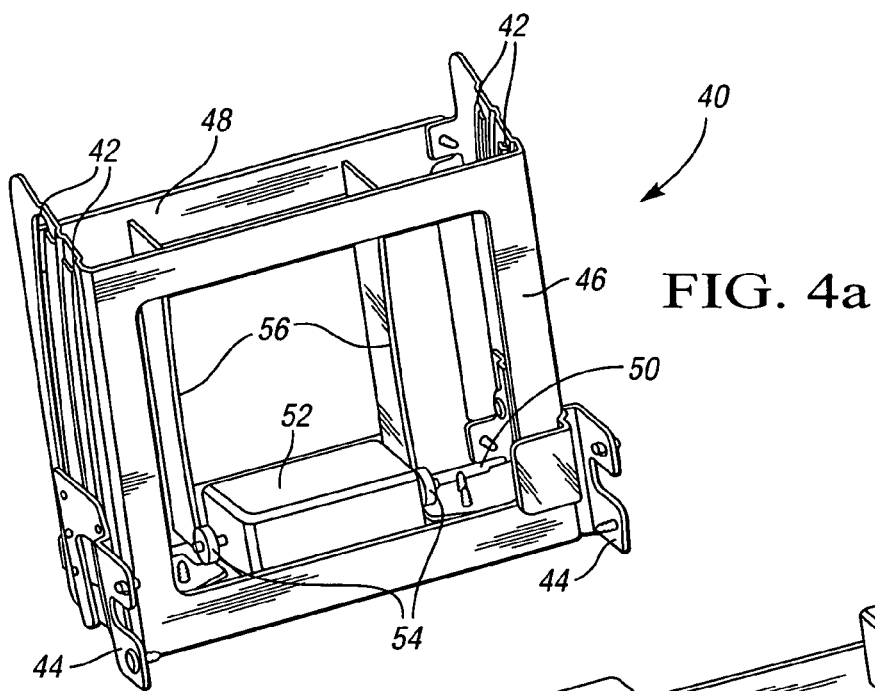
FIG. 4a is a schematic perspective view of a motorized guide member used to move the display screen of FIGS. 1–3b between the retracted and extended positions.

As shown in FIG. 4a, in the preferred embodiment, the guide member 40 comprises a track member 46 attached to a support member 48, with the track member 46 defining the arced tracks 42. The brackets 44 seat within the arced tracks 42, and also attach to a movable plate 50. A motor 52 seats on the movable plate 50. A pair of toothed gears 54 extend from the motor 52 and are rotatable by the motor 52. A pair of toothed plates 56 extend from the support member 48. Preferably, a control module (not shown) communicates with the controller 22 to activate the motor 52 when the screen 20 is touched. Alternatively, a separate push button (not shown) may be included within the vehicle, that, when pushed actuates the motor 52. When the motor 52 is actuated, the gears 54 travel up the toothed plates 56, pulling the movable plate 50 upward. Since the brackets 44 are attached to the movable plate 50, the brackets 44 are likewise drawn upward along the arced tracks 42.

Figure 4B:
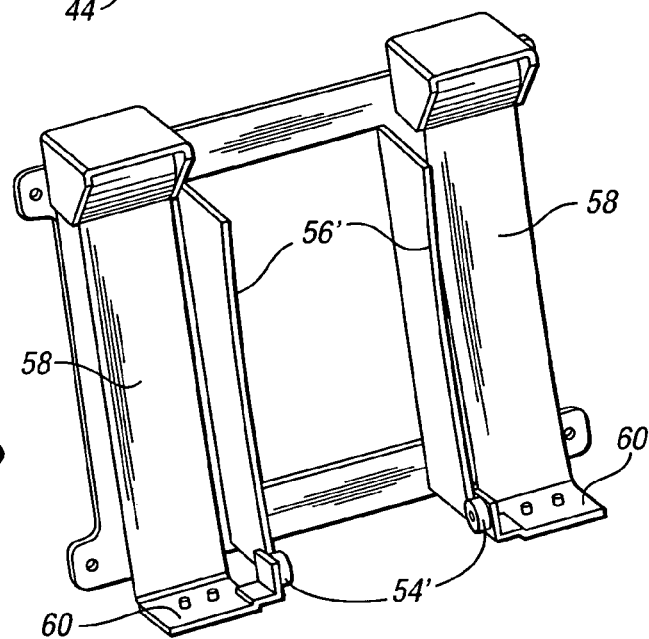
FIG. 4b is a schematic perspective view of an alternative spring-loaded guide member usable as an alternative to the guide member of FIG. 4a to move the display screen of FIGS. 1–3b between the retracted and extended positions.

FIG. 4b shows an alternative support member 48' incorporating a different method of moving the screen 20 of FIGS. 1–2b between the retracted and extended positions. The support member 48' includes a pair of coil springs 58 extending to terminal ends 60. The terminal ends 60 include a pair of toothed gears 54', while a pair of toothed plates 56' extend from the support member 48'. The brackets 44 of FIG. 3a are attachable to the terminal ends 60. FIG. 4b shows the position of the coil springs 58 when the screen 20 is in the retracted position 30. A lock (not shown) but which may be located anywhere along the length of the coil springs 58 to lock the coil springs 58 to the support member 48' maintains the position of the terminal ends 60 such that the screen 20 is in the retracted position 30. When the lock is released, by, for example, pushing down on the door 34 of FIG. 3a, the coil springs 58 wind around themselves, pulling the gears 54' up the toothed plates 56' therewith. The brackets 44 thus travel up the arced tracks 42, taking the screen 20 to the extended position 32.

As shown in FIG. 3a, the door 34 attaches to the console 24 at an opening 62 formed by the console 24, and preferably rests flush with the console 24 at the opening 62 when the screen 20 is in the retracted position 30. A shown in FIG. 2a, in a closed position, the door 34 does not completely cover the opening 62, allowing the screen 20 to be partially visible through the opening 62. As the brackets 44 move along the arced track 42 to pull the screen 20 at least partially through the opening 62 into the extended position 32, shown in FIG. 3b, the door 34 pivots with respect to the console 24. In the preferred embodiment, a pair of pins 64 extend from either side of the screen 20 and seat within slots 66 formed in the door side walls 38, thereby interconnecting the door 34 and the screen 20. Since FIGS. 3a and 3b show a side view of the invention, only one of the side walls 38, one of the slots 66, and one of the pins 64 are shown in the drawings. However, it should be appreciated that a substantially identical sidewall 38 including a slot 66 extends downward from the opposite side of the door 34, and a substantially identical pin 64 extends from the opposite side of the screen 20. In order to ensure that the door 34 at least partially covers the top surface 36 of the screen 20 in both the retracted and extended positions 30, 32, the slots 66 in the side walls 38 are configured to allow the pins 64 to move therein as the screen 20 travels along the arced track 42. The slots 66 may extend through the side walls 38 as shown in FIG. 3a, or may be recessed therein but not extend therethrough. In the preferred embodiment shown in the drawings, the slots 66 are substantially J-shaped. However, depending on the specific configuration of the arced track 42, the slots 66 may be shaped differently; in all configurations, the shape of the slots 66 cooperates with the configuration of the arced track 42 such that the door 34 at least partially covers the top surface 36 of the screen 20. As the screen 20 moves along the arced track 42, the pins 64 travel within the slots 66.

The guide member 40 is preferably configured to allow fine tune adjustment of the screen 20 when in the extended position 32. As discussed above with respect to FIG. 3b, preferably the screen 20 travels slightly past vertical V to the second angle $\alpha_2$ to reach the extended position 32. The final angle of the screen 20 in the extended position 32 is preferably designed to reduce glare and provide optimal visibility to a passenger or driver of average height. In the preferred embodiment, the brackets 44 define adjustment slots 66, with pins 68 extending from the screen 20 into the adjustment slots 66. Fine tune adjustments (i.e., final tilt) may be achieved by pushing the screen 20 back toward vertical V to a third angle $\alpha_3$, if desired, thereby causing the pins 68 to travel within the adjustment slots 66. While FIGS. 3a and 3b show only one of the brackets 44 defining the adjustment slots 66 and one of the pins 68, it should be appreciated that a substantially identical bracket 44 defining an adjustment slot 66 and a substantially identical pin 68 are disposed on the opposite side of the display unit 18.

Figure 5:
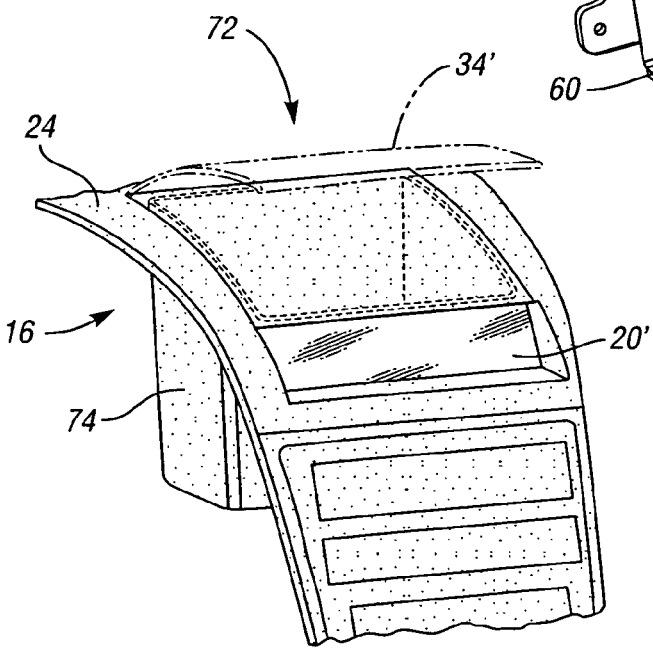
FIG. 5 is a schematic perspective fragmentary view of an embodiment of a display screen restricted to the retracted position of FIG. 2a and having a storage bin located adjacent thereto in lieu of a guide member.

FIG. 5 shows another embodiment of a display unit 72 of the present invention wherein a screen 20' seats within the cavity 16 formed by the instrument panel 10 of FIG. 1 and/or the console 24. In this display unit 72, the screen 20' does not move between retracted and extended positions, and therefore no guide member 40 is necessary. Instead, the screen 20' is fixed within the console 24, in approximately the same position as the screen 20 in the retracted position 30 of FIG. 3a. Because the screen 20' does not move to an extended position, it may have a smaller display surface than the screen 20 of FIG. 3b.

The door 34 pivotally attaches to the console 24, and moves between open and closed positions to selectively allow access to a storage container 74. Since the door 34 and the console 24 are substantially the same in all embodiments, a manufacturer may maintain an inventory of substantially identical consoles 24 and doors 34. If a customer desires a full screen model, the screen 20 will be installed in the cavity 16 of the console 24, along with the door 34 and guide member 40. However, if another customer desires a potentially less costly design not incorporating a full screen, the screen 20' will be installed in the cavity 16 of the console 24, along with door 34 and storage container 74.

While the best modes for carrying out the invention have been described in detail, it is to be understood that the terminology used is intended to be in the nature of words of description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A display unit for a motor vehicle comprising:
    a screen;
    a guide member defining an arced track, said screen being movable with respect to said arced track between a retracted position, wherein said screen rests at a first angle with respect to vertical, and an extended position, wherein said screen extends upward and rests at a second angle with respect to vertical; and
    a motor operatively connected to said guide member, said motor actuatable to move said screen with respect to said arced track between said retracted and extended positions.

2. The display unit of claim 1, wherein said guide member further comprises a bracket slidable along said arced track, said screen being attached to said bracket to move between said retracted and extended positions.

3. The display unit of claim 1, further comprising a door covering a top face of said screen in both said retracted and extended positions.

4. The display unit of claim 3, further comprising:
    at least one side wall extending substantially perpendicularly away from said door and defining a slot; and
    wherein said screen includes a pin which travels along said slot as said screen moves between said retracted and extended positions, thereby allowing said door to cover said top face of said screen throughout movement of said screen between said retracted and extended positions.

5. A display unit for a motor vehicle comprising:
    a screen;
    a guide member defining an arced track, said screen being movable with respect to said arced track between a retracted position, wherein said screen rests at a first angle with respect to vertical, and an extended position, wherein said screen extends upward and rests at a second angle with respect to vertical; and
    a spring operatively connected to said guide member, said screen being releasable upon actuation to move said screen with respect to said arced track between said retracted and extended positions.

6. A display unit for a motor vehicle comprising:
    a screen; and
    a guide member defining an arced track, said screen being movable with respect to said arced track between a retracted position, wherein said screen rests at a first angle with respect to vertical, and an extended position, wherein said screen extends upward and rests at a second angle with respect to vertical;
    wherein said screen is substantially parallel with adjacent vehicle interior structure when said screen rests at said first angle in said retracted position.

7. The display unit of claim 6, wherein said vehicle interior structure is selected from the group consisting of a vehicle console and an instrument panel.

8. A motor vehicle comprising:
    vehicle interior structure at least partially defining a cavity and an opening;
    a door pivotally attached to said vehicle interior structure at said opening; and
    a screen containable within said cavity such that said screen substantially parallels at least a portion of said vehicle interior structure, said screen being at least partially visible through said opening when the door is in a closed position.

9. The vehicle of claim 8, further comprising:
a storage bin disposed within said cavity and accessible through said opening.

10. The vehicle of claim 8, further comprising:
a guide member defining a track, said guide member being disposed within said cavity, said screen being movable with respect to said track between a retracted position wherein said screen is contained within said cavity, and an extended position wherein at least a portion of said screen extends through said opening outside of said cavity.

11. The vehicle of claim 10, wherein said screen is disposed at a first angle in said retracted position; and wherein said track is arced, thereby allowing said screen to be disposed at a second angle different than said first angle when said screen is moved to said extended position.

12. The vehicle of claim 11, wherein said guide member further comprises a bracket slidable along said track, said screen being attached to said bracket to move between said retracted and extended positions.

13. The vehicle of claim 12, wherein said bracket defines an adjustment slot; and
wherein said screen includes a pin which travels along said adjustment slot to move said screen from said second angle to a third angle at said extended position.

14. The vehicle of claim 11, wherein said screen is movable from said second angle to a third angle at said extended position.

15. The vehicle of claim 10, further comprising:
a motor operatively connected to said guide member, said motor actuatable to move said screen along said track between said retracted and extended positions.

16. The vehicle of claim 10, further comprising:
a spring operatively connected to said guide member, said screen being releasable upon actuation to move said screen with respect to said track between said retracted and extended positions.

17. The vehicle of claim 10, wherein said door covers a top face of said screen in both said retracted and extended positions.

18. The vehicle of claim 17, further comprising:
at least one side wall extending substantially perpendicularly away from said door toward said vehicle interior structure and defining a slot; and
wherein said screen includes a pin which travels along said slot as said screen moves between said retracted and extended positions, thereby allowing said door to cover said top face of said screen throughout movement of said screen between said retracted and extended positions.

19. A method of installing a display screen on vehicles comprising:
a) maintaining an inventory of vehicles having substantially identical vehicle interior structures each at least partially defining a cavity and an opening;
b) maintaining an inventory of substantially identical guide members, each of said guide members defining an arced path and being attachable with respect to said vehicle interior structures;
c) maintaining an inventory of a first type of display screen;
d) maintaining an inventory of a second type of display screen;
e) installing one of said first type of display screens on a first of said vehicles having a first vehicle interior structure by:
attaching a first of said guide members to said first vehicle interior structure; and
attaching one of said first type of display screens to said first vehicle interior structure and with respect to said guide member such that said one of said first type of display screens is movable with respect to the arced path of said guide member between a retracted position in which said display screen is disposed substantially within said cavity of said first vehicle interior structure and is substantially parallel to said first vehicle interior structure, and an extended position in which said display screen extends through said opening outside of said cavity; and
f) installing one of said second type of display screen on a second of said vehicles having a second vehicle interior structure by:
attaching one of said second type of display screens with respect to said second vehicle interior structure such that said one of said second type of display screens remains fixed in a position substantially the same as said retracted position of said one of said first type of display screens; and
attaching a storage bin to said second vehicle interior structure within said cavity thereof, said storage bin being accessible through said opening of said second vehicle interior structure.

* * * * *